(12) United States Patent
Lee

(10) Patent No.: US 7,892,700 B2
(45) Date of Patent: Feb. 22, 2011

(54) ELECTRODE CATALYST CONTAINING TWO OR MORE METAL COMPONENTS, METHOD OF PREPARING THE SAME, AND FUEL CELL INCLUDING THE ELECTRODE CATALYST

(75) Inventor: Sang-mock Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 803 days.

(21) Appl. No.: 11/704,603

(22) Filed: Feb. 9, 2007

(65) Prior Publication Data
US 2008/0057370 A1 Mar. 6, 2008

(30) Foreign Application Priority Data
Sep. 4, 2006 (KR) .................. 10-2006-0084824

(51) Int. Cl.
*H01M 8/10* (2006.01)
*B01J 21/18* (2006.01)
(52) U.S. Cl. .................. 429/524; 429/523; 252/182.1
(58) Field of Classification Search .................. 429/523, 429/524; 252/182.1
See application file for complete search history.

(56) References Cited
U.S. PATENT DOCUMENTS
2003/0044672 A1* 3/2003 Fukumoto et al. ............. 429/40
2003/0044674 A1* 3/2003 Mallari et al. ................. 429/44
2004/0115515 A1* 6/2004 Ueda et al. .................... 429/40
2004/0197654 A1* 10/2004 Barker et al. ............. 429/218.1
2006/0057453 A1* 3/2006 Suzuki et al. ................. 429/43
2006/0240256 A1* 10/2006 Woo et al. ................... 428/402

FOREIGN PATENT DOCUMENTS
WO WO 2004/092052 * 10/2004

OTHER PUBLICATIONS
Nomenclature of Inorganic Chemistry, International Union of Pure and Applied Chemistry (IUPAC) Recommendations 2005, Prepared by Neil G. Connelly, Richard M. Hartshorn, Ture Damhus and Alan T. Hutton, p. 51.*

(Continued)

*Primary Examiner*—Ula C Ruddock
*Assistant Examiner*—Amanda Barrow
(74) *Attorney, Agent, or Firm*—Christie, Parker & Hale, LLP

(57) ABSTRACT

An electrode catalyst including two or more metal components used in an anode and/or a cathode of a proton exchange membrane fuel cell (PEMFC) or a direct methanol fuel cell (DMFC), a method of preparing the same, and a fuel cell including the electrode catalyst. The electrode catalyst includes an active Pt-based metal and an inactive La-based metal. By including the inactive metal component in the electrode catalyst, in addition to the active Pt-based metal component, higher catalyst activity can be obtained, and the amount of the expensive Pt-based metal can be decreased so that the fuel cell can be produced at relatively low costs. In addition, the active Pt-based metal and the inactive La-based metal are uniformly distributed so that agglomeration of the active Pt-based metal can be blocked (or prevented) and thus the catalyst activity can be maintained constant for a relatively long period of time.

11 Claims, 6 Drawing Sheets

OTHER PUBLICATIONS

D.L. Anton, "Hydrogen desorption kinetics in transition metal modified NaAlH4," Journal of Alloys and Compounds, 356-357 (2003) 400-404.*

Baldauf, et al., *Status of the development of a direct methanol fuel cell*; Journal of Power Sources 84 (1999) 161-166.

Chinese Office Action dated Jul. 7, 2010 of the corresponding Chinese Patent Application No. 200710005773.9, noting listed references in this IDS.

* cited by examiner

ELECTRODE CATALYST CONTAINING TWO OR MORE METAL COMPONENTS, METHOD OF PREPARING THE SAME, AND FUEL CELL INCLUDING THE ELECTRODE CATALYST

CROSS-REFERENCE TO RELATED PATENT APPLICATION

This application claims priority to and the benefit of Korean Patent Application No. 10-2006-0084824, filed on Sep. 4, 2006, in the Korean Intellectual Property Office, the entire content of which is incorporated herein by reference.

BACKGROUND OF THE INVENTION

1. Field of the Invention

The present invention relates to an electrode catalyst containing two or more metal components, a method of preparing the same, and a fuel cell including the electrode catalyst.

2. Description of the Related Art

A fuel cell is an energy generating system in which a fuel gas is electrochemically reacted with an oxidizing gas to generate energy and the generated energy is directly converted into an electrical energy. Fuel cells can be categorized into melt carbonate electrolyte type fuel cells, phosphoric acid electrolyte type fuel cells, alkali electrolyte type fuel cells, polymer electrolyte type fuel cells, etc.

Polymer electrolyte type fuel cells include proton exchange membrane fuel cells (PEMFCs), which use hydrogen gas as a fuel, and direct methanol fuel cells (DMFCs) in which liquid methanol used as fuel is directly provided to an anode. Polymer electrolyte type fuel cells have high current density and energy conversion capability. Also, polymer electrolyte type fuel cells are operable at room temperature and can be miniaturized and hermetically fabricated, and thus are widely applicable in such fields as pollution-free automobiles, home-use power generation systems, mobile communication equipment, medical devices, military equipment, aerospace equipment and the like.

PEMFCs are an energy generating system which generates direct current as a result of an electrochemical reaction of hydrogen and oxygen. A structure of a PEMFC is illustrated in FIG. 1.

Referring to FIG. 1, a PEMFC includes an anode, a cathode, and a proton conductive membrane 11 interposed between the anode and the cathode. The proton conductive membrane 11 has a thickness ranging from 50 to 200 μm and is formed of a solid polymer electrolyte. The anode and the cathode are gas diffusion electrodes respectively including electrode substrates 14 and 15, which provide reaction gas, and catalyst layers 12 and 13 in which the reaction gas is oxidized and reduced. Hereinafter, the cathode and the anode can also be referred to as gas diffusion electrodes. In FIG. 1, a carbon sheet 16 having gas diffusion holes and functioning as a current collector is also shown.

When a hydrogen gas is provided to the PEMFC described above, an oxidation reaction occurs at the anode so that hydrogen molecules are divided into hydrogen ions and electrons. Such liberated hydrogen ions move to the cathode through the proton conductive membrane 11. By contrast, at the cathode, a reduction reaction occurs so that oxygen molecules receive electrons and are transformed into oxygen ions. The generated oxygen ions are reacted with the hydrogen ions from the anode to generate water. As illustrated in FIG. 1, in the gas diffusion electrodes of the PEMFC, the catalyst layers 12 and 13 are formed on the electrode substrates 14 and 15, respectively. The electrode substrates 14 and 15 are formed of carbon cloth or carbon paper and their surfaces are treated such that reaction gas, water which moves to the proton conductive membrane 11, and water produced resulting from the reaction of oxygen ions and hydrogen ions can easily pass through.

A DMFC has substantially the same structure as the PEMFC, except that instead of using hydrogen as the reaction gas, liquid methanol is used and provided to an anode, and an oxidation reaction is promoted by a catalyst so that hydrogen ions, electrons, and carbon dioxide are generated. Although DMFCs have lower battery efficiency than PEMFCs, DMFCs can be provided in a liquid state so that they can be more easily used with (or placed into) portable electrical applications.

Also, during a reduction reaction of oxygen molecules at the cathode of the fuel cell, Pt atoms are typically used as a catalyst for transforming oxygen molecules into oxygen ions. Although Pt atoms are a good catalyst during the oxygen reduction reaction, they are rare and expensive and thus large amount of Pt atoms cannot be commercially used. In addition, when Pt metals are used for a long period time, they agglomerate so that catalyst activity decreases. Accordingly, there is a need for a catalyst to use a smaller amount of Pt while increasing its tolerance for carbon monoxide. Also, there is a need for a catalyst that can include components other than Pt.

A cathode catalyst can be a catalyst containing two or more components (or elements) selected from Fe, Co, Ni, Cr, Cu, or the like. A carbon monoxide-tolerant catalyst can be a catalyst containing two or more components selected from Pt, Ru, Rh, Pd, Ir, W, Mo, Sn, Mn, or the like. In particular, a PtRu catalyst is primarily used in PEMFCs and DMFCs due to its excellent tolerance with respect to carbon monoxide. By using such catalysts containing two or more components, the amount of Pt used can be decreased. However, there is still an agglomeration phenomenon due to binding of Pt and/or other metals.

SUMMARY OF THE INVENTION

An aspect of the present invention provides an electrode catalyst which contains two or more metal components (or elements) including active and inactive metals which are uniformly dispersed with (on or in) a support in which the active metal has a relatively small crystal size and high catalyst activity. An aspect of the present invention provides a method of preparing an electrode catalyst which contains two or more metal components. An aspect of the present invention provides a fuel cell including the electrode catalyst which contains two or more metal components. More particularly, aspects of the present invention provide an electrode catalyst containing two or more metal components including an active Pt-based metal and an inactive La-based metal and having a relatively high catalyst activity when it is used in an anode and/or a cathode of a proton exchange membrane fuel cell (PEMFC) or a direct methanol fuel cell (DMFC), a method of preparing the same, and a fuel cell including the electrode catalyst According to an embodiment of the present invention, there is provided an electrode catalyst used in a fuel cell, the electrode catalyst being a supported catalyst in which a catalyst is supported by a conductive support and including: an active Pt-based metal; and an inactive La-based metal, wherein the active Pt-based metal and the inactive La-based metal are uniformly dispersed with the conductive support and do not form an alloy.

According to another embodiment of the present invention, there is provided a method of preparing an electrode catalyst, the method including: dissolving an ionically bonded compound of an active Pt-based metal and halogen and an ionically bonded compound of an inactive La-based metal and halogen in a solvent to form a homogenous solution; mixing the homogenous solution with a support to form a resultant mixture; heating the resultant mixture to evaporate the solvent so that the resultant mixture is dried; and heat treating the dried mixture in a hydrogen and inert gas atmosphere.

According to another embodiment of the present invention, there is provided a fuel cell including an electrode catalyst, the electrode catalyst being a supported catalyst in which a catalyst is supported by a conductive support and including an active Pt-based metal and an inactive La-based metal, wherein the active Pt-based metal and the inactive La-based metal are uniformly dispersed with the conductive support and do not form an alloy.

In view of the foregoing, an electrode catalyst according to one embodiment includes an inactive La-based metal in addition to an active Pt-based metal so that the amount of Pt used is relatively low and catalyst activity is relatively high. Also, the active Pt-based metal and the inactive La-based metal do not form an alloy and are uniformly dispersed so that an agglomeration phenomenon of the active Pt-based metal can be blocked (or prevented) and thus the electrode catalyst has a relatively high efficiency. Therefore, a fuel cell including the electrode catalyst has high efficiency and a relatively long lifespan.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
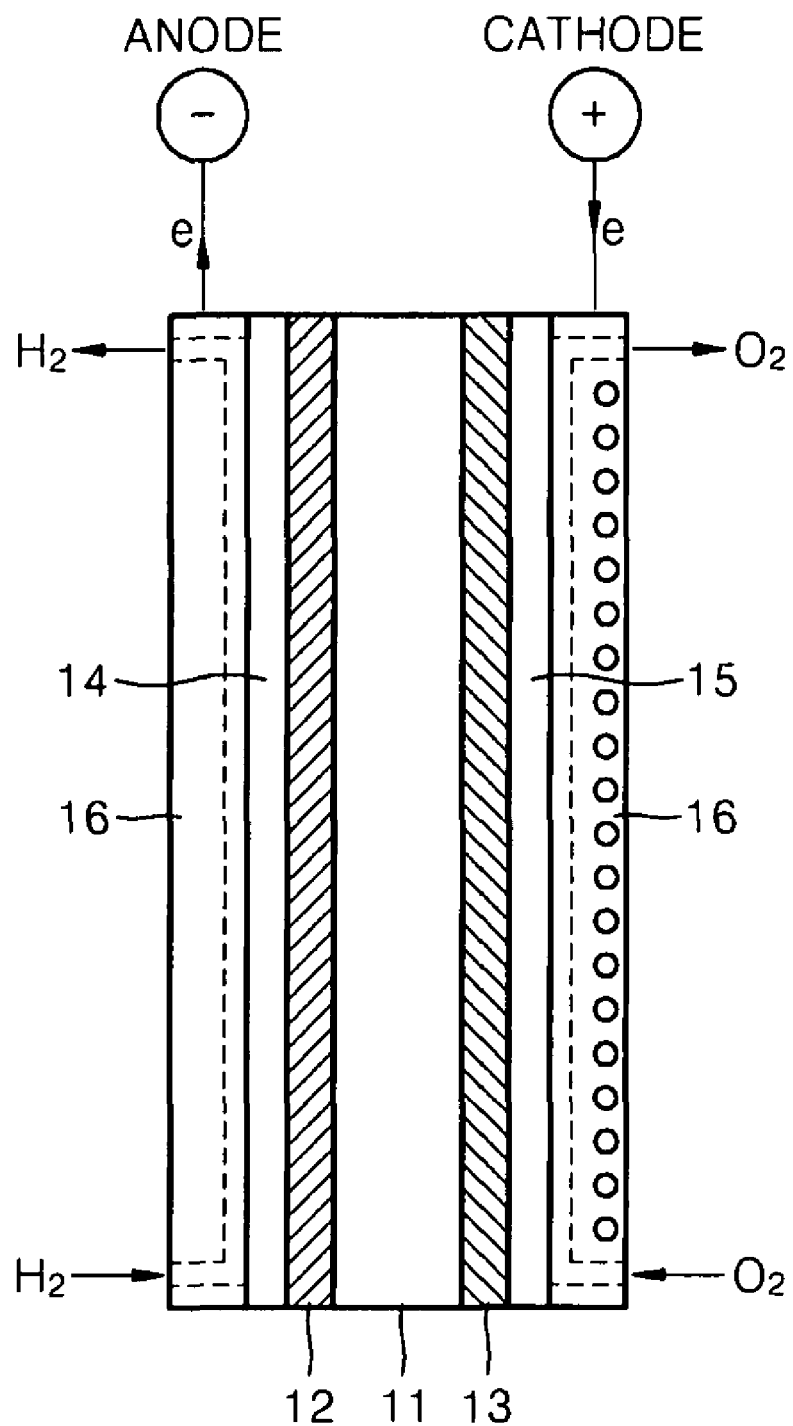
FIG. 1 is a schematic view of a fuel cell.

In the following detailed description, only certain exemplary embodiments of the present invention are shown and described, by way of illustration. As those skilled in the art would recognize, the invention may be embodied in many different forms and should not be construed as being limited to the embodiments set forth herein.

An electrode catalyst used in a fuel cell according to an embodiment of the present invention is a supported catalyst in which a catalyst is supported by a conductive support. The electrode catalyst includes an active Pt-based metal and an inactive La-based metal, wherein the active Pt-based metal and the inactive La-based metal are uniformly dispersed with (on or in) the conductive support and does not form an alloy.

The active Pt-based metal can be Pt alone or an alloy of Pt and a transition metal. The transition metal may include at least one metal selected from Ru, Rh, Pd, Os, Ir, Ag, W, Cu, Fe, Co, Ni, Mo, Cr, and Mn. However, the transition metal is not limited thereto.

When the active Pt-based metal is an alloy of Pt and an transition metal, the mole ratio of Pt and the transition metal may be in the range from 10:1 to 1:10. When the mole ratio of Pt and the transition metal is outside this range, the catalyst activity may decrease.

The inactive La-based metal may include at least one lanthanoid selected from Tm, Lu, Yb, Er, Ho, Dy, Tb, Gd, Eu, Ce, and La. In one embodiment, the inactive La-based metal is Tm.

For example, the active Pt-based metal is Pt and the inactive La-based metal is Tm.

In the electrode catalyst according to an embodiment of the present invention, the mole ratio of the active Pt-based metal to the inactive La-based metal may be in the range from 10:1 to 1:10. When the amount of the active Pt-based metal is less than the lower limit of this range, the catalyst activity may be too low. By contrast, when the amount of the active Pt-based metal is more than the upper limit of this range, the excess use of the active Pt-based metal does not bring about any increase in catalyst activity, which is uneconomical.

The conductive support used in the current embodiment of the present invention can be active carbon, carbon black, conductive carbon, graphite, carbon nano tube, carbon nano fiber, or carbon molecular sieve.

The amount of the active Pt-based metal supported by the support may be in the range from 5 to 80 wt % of the entire supported catalyst. When the amount of the active Pt-based metal is less 5 wt % of the entire supported catalyst, catalyst activity may be too low. By contrast, when the amount of the active Pt-based metal is more than 80 wt % of the entire supported catalyst, the excess use of the active Pt-based metal does not bring about any increase in catalyst activity, which is uneconomical.

A method of preparing an electrode catalyst containing two or more metal components according to an embodiment of the present invention includes: dissolving an ionically bonded compound of an active Pt-based metal and halogen and an ionically bonded compound of an inactive La-based metal and halogen in a solvent to form a homogenous solution; mixing the homogenous solution with a support to form a resultant mixture; heating the resultant mixture to evaporate the solvent so that the resultant mixture is dried; and heat treating the dried mixture in a hydrogen and inert gas atmosphere.

The ionically bonded compound of an active Pt-based metal and halogen may further include an ionically bonded compound of a transition metal and halogen. The transition metal may include at least one metal selected from Ru, Rh, Pd, Os, Ir, Ag, W, Cu, Fe, Co, Ni, Mo, Cr, and Mn. However, the transition metal is not limited thereto.

The ionically bonded compound of an inactive La-based metal and halogen may be an ionically bonded compound of halogen and at least one lanthanoid selected from Tm, Lu, Yb, Er, Ho, Dy, Tb, Gd, Eu, Ce, and La. For example, the ionically bonded compound is formed of Tm and halogen.

The halogen used in the present embodiment can be any suitable halogen that can be ionically bonded to the active Pt-based metal and the inactive La-based metal. The halogen can be chlorine.

Examples of the ionically bonded compound of the active Pt-based metal and halogen include $H_2PtCl_6$ and $RuCl_3$. Examples of the ionically bonded compound of the inactive La-based metal and halogen include $TmCl_3$ and $LuCl_3$.

In the method according to an embodiment of the present invention, the content ratio of the ionically bonded compound of the active Pt-based metal and halogen to the ionically bonded compound of the inactive La-based metal and halogen which are dissolved in the solvent may be in the range of 10:1 to 1:10. When the content ratio of the ionically bonded compound of the active Pt-based metal and halogen to the ionically bonded compound of the inactive La-based metal and halogen is outside this range, it is difficult to obtain a proper content ratio of the active compound to the inactive compound in the electrode catalyst so that catalyst activity improvement effects cannot be obtained.

The solvent used in the present embodiment can be any suitable solvent that can dissolve the ionically bonded compound of the active Pt-based metal and halogen and the ionically bonded compound of the inactive La-based metal and halogen. The solvent can be acetone, $C_2$-$C_8$ alcohol, a mixture of acetone and water, a mixture of $C_2$-$C_8$ alcohol and water, or the like.

The ionically bonded compound of the active Pt-based metal and halogen and the ionically bonded compound of the inactive La-based metal and halogen are added to the solvent and sufficiently mixed together until a homogeneous solution is obtained.

The support can be any suitable support that sufficiently supports a precursor and does not decrease the catalyst activity. The support can be active carbon, carbon black, conductive carbon, graphite, carbon nano tube, carbon nano fiber, or carbon molecular sieve.

Greater amount of the solution to be able to be mixed with the support is desired to improve the efficiency of the present invention. The amount of the solution may depend on kinds of the precursor compound and the support.

The support absorbing the homogenous solution is mixed at a constant (or substantially constant) speed and dried at a temperature from 50 to 150° C.

The drying may be performed through two steps. First, the mixture of the homogenous solution and the support is heated to remove the solvent at a surface drying temperature from 50 to 95° C. until the surface of the mixture of the homogenous solution and the support is dried. When the drying temperature is lower than 50° C., the drying is insufficient. By contrast, when the drying temperature is higher than 95° C., it is difficult to form a uniform catalyst.

Subsequently, the dried mixture is heated in a vacuum condition at a temperature higher than the surface drying temperature to completely remove the solvent. Such a high temperature drying can be performed at a temperature from 60 to 150° C. for a time period from 2 hours to 24 hours. When the drying temperature is lower than 60° C., the drying may be insufficiently completed. By contrast, when the drying temperature is higher than 150° C., a precursor of the Pt-based metal may decompose so that the catalyst activity may decrease. When the vacuum high temperature drying time period is shorter than 2 hours, the drying may be insufficiently completed. By contrast, when the vacuum high temperature drying time period is longer than 24 hours, the excess drying time period does not bring about any increase in drying effect, which is uneconomical The heat treating may be performed in an inert atmosphere or an inert atmosphere including a reducing gas. The inert gas can be He, Ar, $N_2$, or mixtures of one or more of these inert gases and $H_2$. In these mixtures, the amount of $H_2$ may be 90 vol % or less. When the amount of H is more than 90 vol %, excess reduction occurs so that produced catalyst metal may have too large of a particle size.

In the heat treating, the temperature may be increased at a rate from 0.1 to 20° C. per minute, and the heat treatment temperature may be in the range from 200 to 600° C. When the temperature increasing rate is less than 0.1° C. per minute, the heat treating is prolonged. By contrast, when the temperature increasing rate is more than 20° C. per minute, the catalyst metal may have too large of a particle size. When the heat treating temperature is lower than 200° C., the catalyst reduction may not occur well. By contrast, when the heat treating temperature is higher than 600° C., the catalyst metal may have too large of a particle size.

The heat treating may be performed for a time period from 0.5 hours to 10 hours. When the heat treating time period is less than 0.5 hours, the catalyst reduction may not occur well. By contrast, when the heat treating time period is more than 10 hours, the catalyst metal may have too large of particle size.

In the electrode catalyst containing two or more metal components prepared as described above, the active Pt-based metal is crystallized and the inactive La-based metal is dispersed between the active Pt-based metal and is not crystallized, so that the inactive La-based metal can disperse (or separate) the active Pt-based metal. Therefore, the active Pt-based metal may have smaller crystal size and thus the catalyst activity increases. In addition, since the inactive La-based metal separates the active Pt-based metal from other adjacent active Pt-based metal, an agglomeration phenomenon occurring between active Pt-based metals does not occur and thus the catalyst activity can be maintained more constantly (or can be maintained substantially constant for a relatively long period of time).

A fuel cell according to an embodiment of the present invention includes the electrode catalyst containing two or more metal components. In the present invention, the electrode catalyst can be used in both a cathode and an anode. The type of fuel cell is not limited to the above described embodiments and can be a proton exchange membrane fuel cell (PEMFC) or a direct methanol fuel cell (DMFC).

The following examples illustrate the present invention in more detail. However, the present invention is not limited by these examples.

Example 1

PtTm/C Electrode Catalyst 0.2 g (0.73 mmol) of $TmCl_3$ and 0.53 g (1 mmol) of $H_2PtCl_6$ were dissolved in 2.0 ml of acetone to obtain a homogenous solution. 0.784 g of carbon black (Ketjen Black EC300J) was added to the homogenous solution and uniformly mixed for one hour. The mixture was left in this mixed state for at least 6 hours at room temperature, and then heated in an oven at 60° C. for 12 hours to completely remove the solvent. The heated mixture was then cooled at room temperature. In a hydrogen and nitrogen atmosphere, the dried mixture was heated to 400° C. at a temperature increasing rate of 1° C. per minute and left in this 400° C. state for 60 minutes, and then heated to 410° C. at a temperature increasing rate of 5° C. per minute and left in this 410° C. state for 60 minutes.

Example 2

PtTm/C Electrode Catalyst 0.6 g (2.18 mmol) of $TmCl_3$ and 1.07 g (2.06 mmol) of $H_2PtCl_6$ were dissolved in 2.0 ml of acetone to obtain a homogenous solution. 0.784 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 400° C. at a temperature increasing rate of 1° C. per minute and left in this 400° C. state for 60 minutes, and then heated to 410° C. at a temperature increasing rate of 5° C. per minute and left in this 410° C. state for 60 minutes.

Example 3

PtTm/C Electrode Catalyst 0.4889 g (1.78 mmol) of $TmCl_3$ and 1.125 g (2.1 mmol) of $H_2PtCl_6$ were dissolved in 1.5 ml of acetone to obtain a homogenous solution. 0.5 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 200° C. at a temperature increasing rate of 0.6° C. per minute and left in this 200° C. state for 120 minutes, and then the heated mixture was heated to 250° C. at a temperature increasing rate of 5° C. per minute and left in this 250° C. state for 120 minutes.

Comparative Example 1

Pt/C Electrode Catalyst 0.84 g (1.6 mmol) of $H_2PtCl_6$ was dissolved in 2.0 ml of acetone to obtain a homogenous solution. 0.784 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 200° C. at a temperature increasing rate of 0.6° C. per minute and left in this 200° C. state for 120 minutes, and then the heated mixture was heated to 250° C. at a temperature increasing rate of 5° C. per minute and left in this 250° C. state for 300 minutes.

Comparative Example 2

Pt/C Electrode Catalyst 0.84 g (1.6 mmol) of $H_2PtCl_6$ was dissolved in 2.0 ml of acetone to obtain a homogenous solution. 0.784 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 400° C. at a temperature increasing rate of 1° C. per minute and left in this 400° C. state for 120 minutes, and then heated to 450° C. at a temperature increasing rate of 5° C. per minute and left in this 450° C. state for 120 minutes.

Comparative Example 3

PtRu/C Electrode Catalyst 0.159 g (1.6 mmol) of $RuCl_3$ and 0.84 g (1.6 mmol) of $H_2PtCl_6$ were dissolved in 2.0 ml of acetone to obtain a homogenous solution. 0.784 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 200° C. at a temperature increasing rate of 0.6° C. per minute and left in this 200° C. state for 120 minutes, and then heated to 250° C. at a temperature increasing rate of 5° C. per minute and left in this 250° C. state for 300 minutes.

Comparative Example 4

PtRu/C Electrode Catalyst 0.159 g (1.6 mmol) of $RuCl_3$ and 0.84 g (1.6 mmol) of $H_2PtCl_6$ were dissolved in 2.0 ml of acetone to obtain a homogenous solution. 0.784 g of carbon black (Ketjen Black EC300J) was added to the homogenous solution and uniformly mixed for one hour. The mixture was left in this mixed state for 6 hours or more at room temperature, and then heated in an oven at 60° C. for 12 hours to completely remove the solvent. The heated mixture was then cooled at room temperature. In a hydrogen and nitrogen atmosphere, the dried mixture was heated to 400° C. at a temperature increasing rate of 1° C. per minute and left in this 400° C. state for 60 minutes, and then heated to 410° C. at a temperature increasing rate of 5° C. per minute and left in this 410° C. state for 60 minutes.

(Measurement)

Metal Content Measurement

The content of metal contained in respective samples was measured using an inductively coupled plasma spectrometer (ICP) (produced by Shimadzu Inc., ICPS-8100).

The results are shown in Table 1 below.

Dispersion State and Particle Size of Metal

The dispersion state, crystal size, and composing elements of metal components contained in respective samples prepared according to Examples 1, 2, and 3 and Comparative Examples 1 and 2 were measured using TEM and EDS (produced by FEI Titan Inc., F30 ST).

Figure 2:
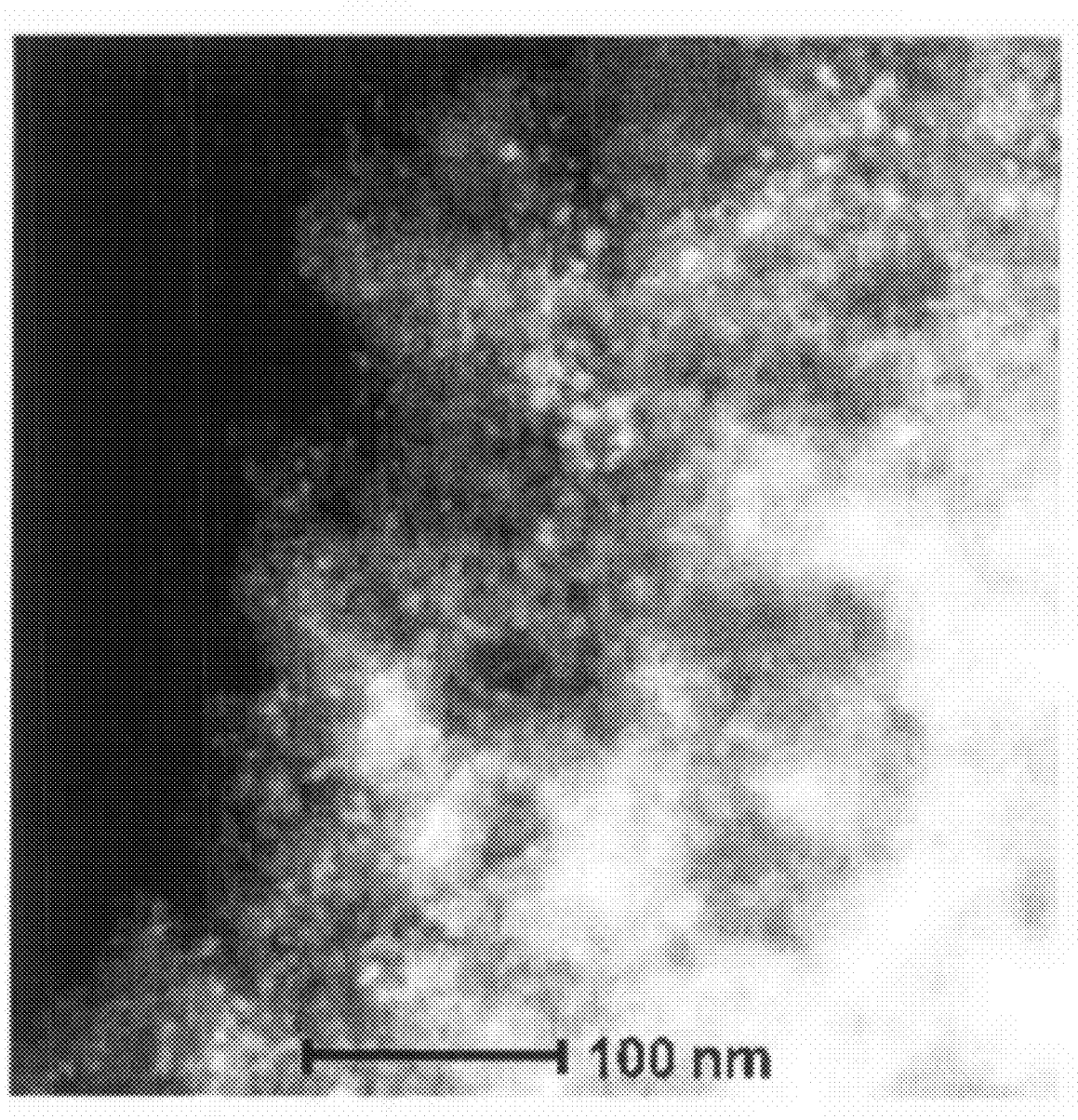
FIG. 2 is an image of transmission electron microscopy (TEM) showing the dispersion state and particle size of Pt and Tm in an electrode catalyst prepared according to Example 1.
Figure 3:
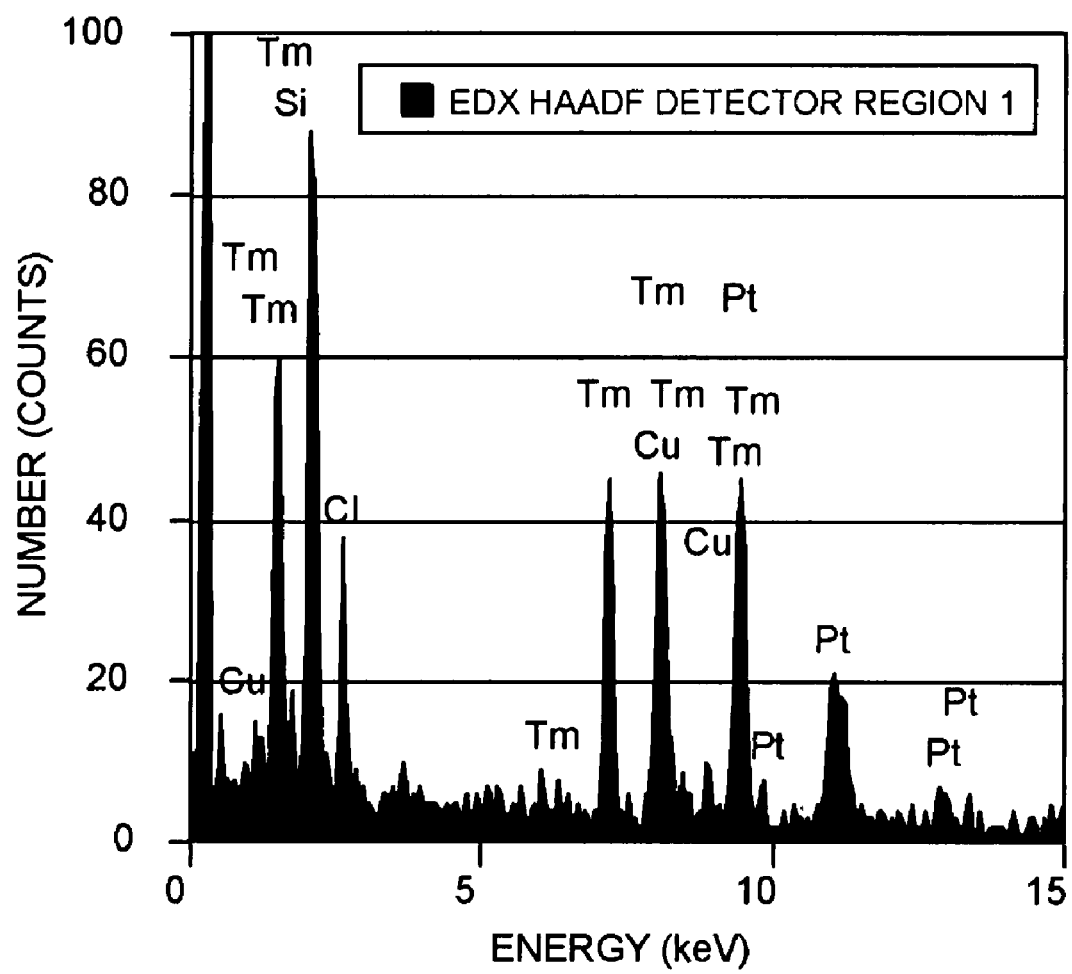
FIG. 3 is an image of energy dispersive spectroscopy (EDS) showing the dispersion state and particle size of Pt and Tm in an electrode catalyst prepared according to Example 1.

The results obtained using TEM are shown in FIG. 2, and the results obtained using EDS are shown in FIG. 3.

Referring to FIG. 2, it can be seen that Pt and Tm are uniformly dispersed and crystals are randomly formed. The size of the crystals is about 3.9 nm.

Referring to FIG. 3, it can be seen that Pt and Tm are separated from each other in the catalyst (and do not form an alloy).

Crystallinity

An average particle size, crystallinity, and alloy formation of metal crystal were measured using XRD (produced by Philips Inc, X'PERT Pro).

Figure 4:
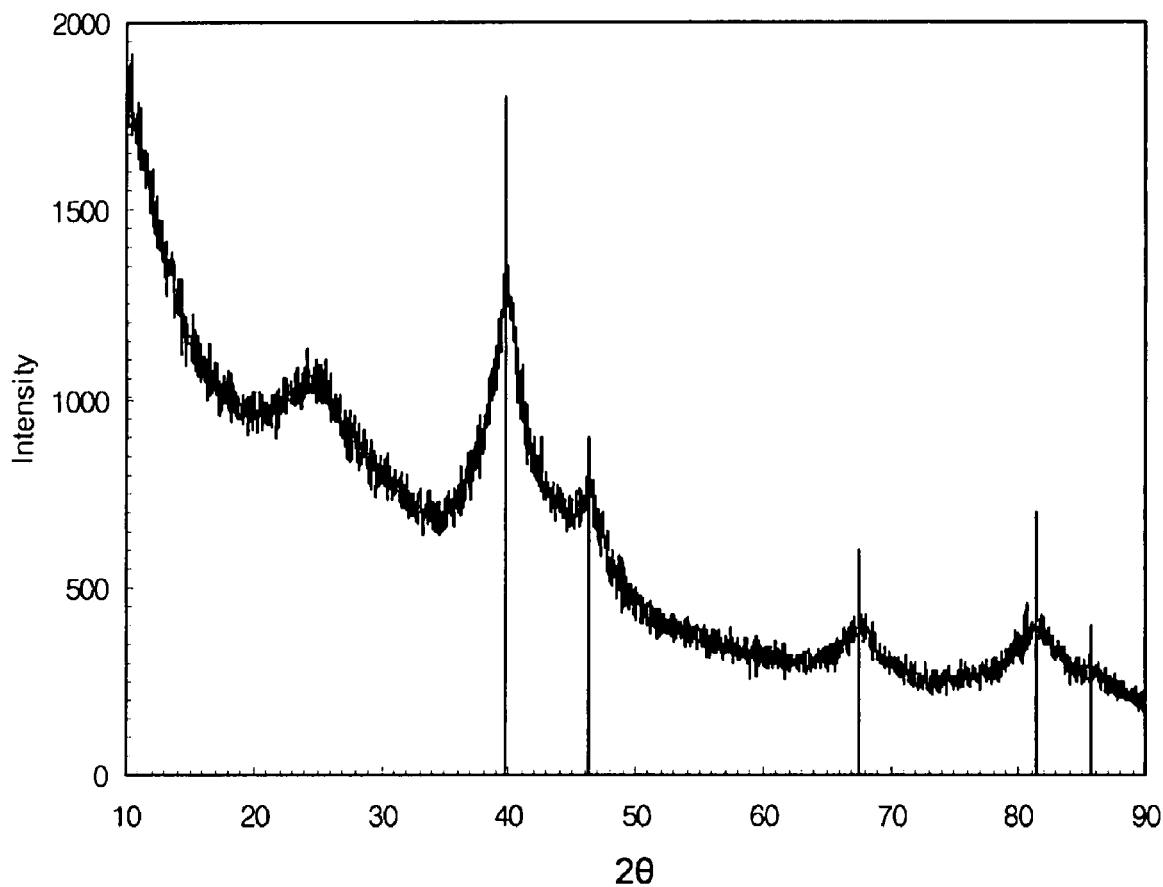
FIG. 4 is a graph illustrating results of X-ray diffraction analysis of metal particles according to Example 1.
Figure 4:
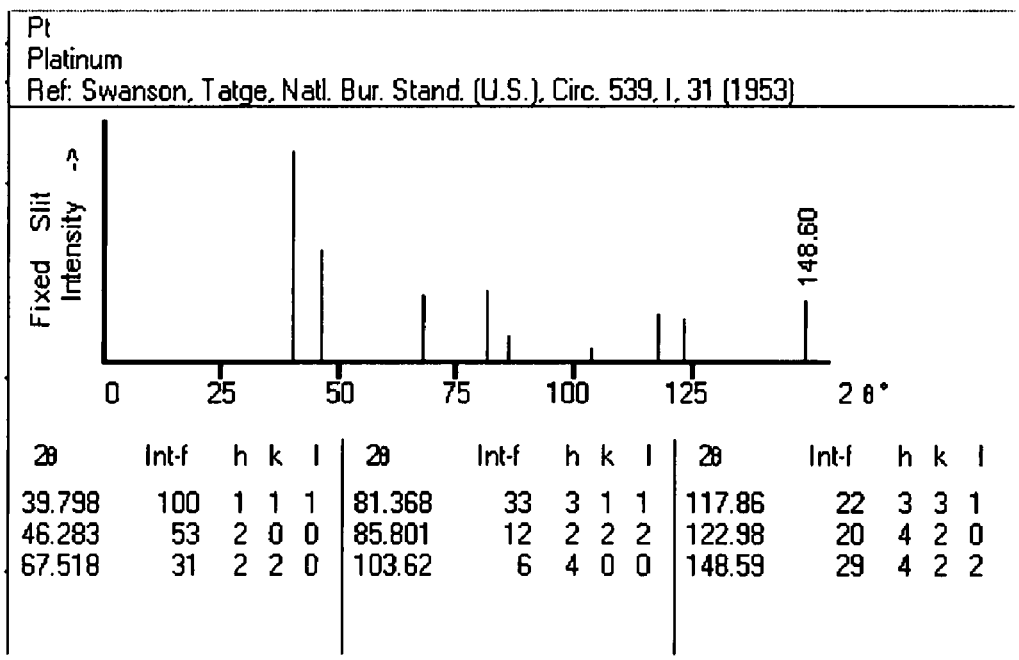

The results are shown in FIG. 4. In FIG. 4, the graph at the bottom is an XRD reference of a standard Pt atom, cited from Swanson, Tatge, Natl. Bur. Stand. (U.S.), Circ. 539, 1, 31(1953).

Referring FIG. 4, the average particle size of the metal crystal is about 3.9 nm which is the same as the results obtained using EDS. In addition, the metal crystal particle according to the present invention is the same as a pure Pt atom. Accordingly, it can be seen that the crystal particle according to Examples 1, 2, and 3 of the present invention is formed of Pt alone, Tm is not crystallized, and Pt and Tm do not form an alloy.

Electrode Activity

The samples obtained according to Examples 1, 2, and 3 and Comparative Examples 1 and 2 were mixed with Nafion (DuPont DE-1021), applied on an electrode substrate formed from carbon paper (TGP-H-090 produced by Toray Inc.), and then dried to produce an electrode. The electrode was installed in a half cell and its electrochemical properties were measured. A reference electrode was Ag/AgCl saturated with KCl, and electrochemical properties were measured using SI 1287 produced by Solartron Inc. Since Pt is generally used as a cathode catalyst, a degree of activity during an oxygen reduction reaction (ORR) was measured. In addition, since Pt can also be used as an anode catalyst, a degree of activity during a methanol oxidation reaction (MOR) was measured.

Figure 5:
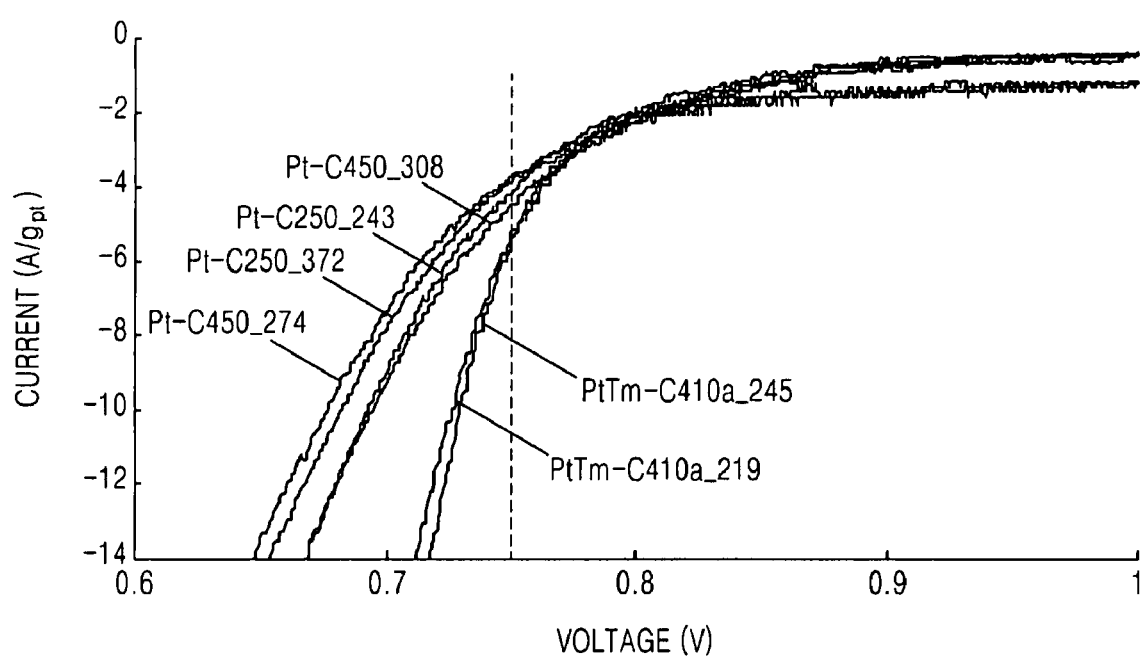
FIG. 5 is a graph illustrating catalyst activity of an electrode catalyst prepared according to Example 1 during an oxygen reduction reaction.

Results of the electrode activity of ORR at the cathode are shown in Table 1 and FIG. 5.

TABLE 1

| Section | XRD Results (Crystal Size, nm) | ICP Results (Pt wt %) | ORR Activity (A/$g_{pt}$) |
|---|---|---|---|
| Example 1 | 3.9 | 15.67 | 5.5 |
| Example 2 | 11.4 | 21.46 | 2.6 |
| Example 3 | 9.6 | 30.63 | 5.6 |
| Comparative Example 1 | 1.7 | 27.32 | 4.2 |
| Comparative Example 2 | 2.1 | 27.21 | 3.9 |

Referring to Table 1 and FIG. 5, the PtTm/C electrode catalysts prepared according to Examples 1, 2, and 3 are shown to have a larger crystal size than the Pt/C electrode catalysts prepared according to Comparative Examples 1 and 2, but the PtTm/C electrode catalysts prepared according to Examples 1, 2, and 3 have from 1 to 2 A/g higher activity during a reduction reaction than the Pt/C electrode catalysts prepared according to Comparative Examples 1 and 2. Accordingly, it can be assumed that when the crystal size is the same or smaller, activity can be further improved. Also, the electrode catalysts prepared according to Examples 1, 2, and 3 have a larger crystal size but about 12 wt % smaller Pt content than the electrode catalysts prepared according to Comparative Examples 1 and 2. That is, the electrode activity is improved with a smaller amount of Pt in the electrode catalyst.

Figure 6:
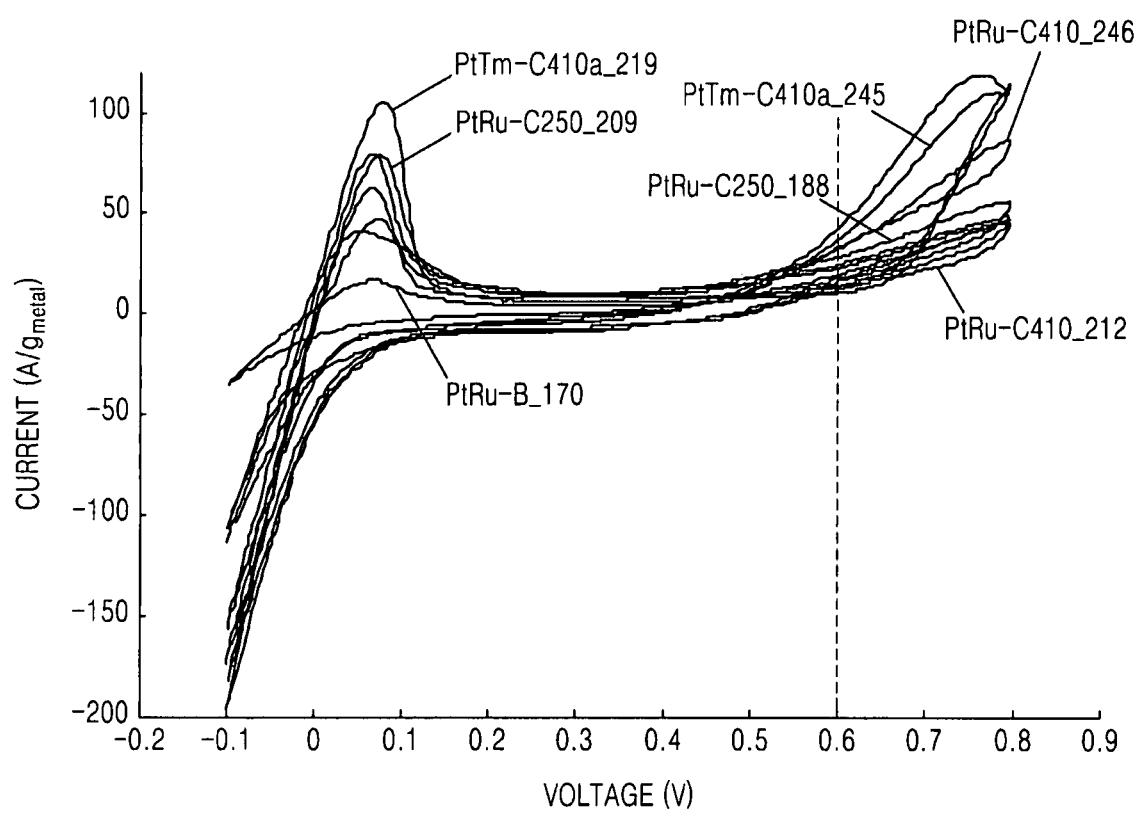
FIG. 6 is a graph illustrating catalyst activity of an electrode catalyst prepared according to Example 1 during a methanol oxidation reaction.

Results of the electrode activity during a MRR are shown in Table 2 and FIG. 6.

TABLE 2

| Section | XRD Results (Crystal Size, nm) | ICP Results (Pt wt %) | ICP Results (Total Metal wt %) | MOR Degree of Activity (A/$g_{metal}$) |
|---|---|---|---|---|
| Example 1 | 3.9 | 15.67 | 25.97 | 10.1 |
| Example 2 | 11.4 | 21.46 | 39.61 | 3.3 |
| Example 3 | 9.6 | 30.63 | 51.66 | 11.2 |
| Comparative Example 3 | 3.5 | 17.9 | 27.08 | 12.0 |
| Comparative Example 4 | 2.9 | 17.31 | 27.70 | 12.3 |

Referring to Table 2 and FIG. 6, the PtTm/C electrode catalysts prepared according to Examples 1, 2, and 3 have a larger crystal size than the PtRu/C electrode catalyst prepared according to Comparative Example 3 and 4, but the PtTm/C electrode catalysts prepared according to Examples 1, 2, and 3 have about the same Pt content therein as the PtRu/C electrode catalyst prepared according to Comparative Example 3 and 4. Also, the PtTm/C electrode catalysts prepared according to Examples 1, 2, and 3 have about the same level of activity of methanol oxidation reaction as the PtRu/C electrode catalyst prepared according to Comparative Example 3 and 4. That is, it can be seen that an electrode catalyst prepared according to an embodiment of the present invention can also be used as an anode catalyst because it shows similar activity to a PtRu/C electrode catalyst which is typically used as a conventional anode catalyst.

In view of the foregoing, an electrode catalyst according to the present invention includes an inactive La-based metal as well as an active Pt-based metal so that the amount of Pt contained in the active Pt-based metal can be decreased and thus a fuel cell can be produced at a relatively low costs. In addition, since the metal crystal in the electrode catalyst can have a relatively small size, even a relatively small amount of the active Pt-based metal can be sufficient to obtain a relatively high catalyst activity. Furthermore, since the active Pt-based metal and the inactive La-based metal are uniformly distributed (and separated from each other) so that the agglomeration of the active Pt-based metal can be blocked (or prevented), the catalyst activity can be maintained substantially constant for a relatively long period of time.

While the invention has been described in connection with certain exemplary embodiments, it will be appreciated by those skilled in the art that the invention is not limited to the disclosed embodiments, but, on the contrary, is intended to cover various modifications included within the principles and spirit of the invention, the scope of which is defined in the claims and their equivalents.

What is claimed is:

1. An electrode catalyst used in a fuel cell, the electrode catalyst being supported by a conductive support and comprising:
   an ionically bonded compound having an active Pt-based metal and halogen; and
   an ionically bonded compound having an inactive La-based metal and halogen, wherein the ionically bonded compound having the active Pt-based metal and halogen, and the ionically bonded compound having the inactive La-based metal and halogen are uniformly dispersed with the conductive support and do not form an alloy, wherein the Pt-based metal comprises Pt, and wherein the inactive La-based metal comprises at least one lanthanoid selected from the group consisting of Tm, Lu, Yb, Er, Ho, Dy, Tb, Gd, Eu, and La.

2. The electrode catalyst of claim 1, wherein the active Pt-based metal further comprises at least one transition metal selected from the group consisting of Ru, Rh, Pd, Os, Ir, Ag, W, Cu, Fe, Co, Ni, Mo, Cr, and Mn.

3. The electrode catalyst of claim 2, wherein the mole ratio of Pt and the transition metal is in the range from 10:1 to 1:10.

4. The electrode catalyst of claim 1, wherein the inactive La-based metal comprises Tm.

5. The electrode catalyst of claim 1, wherein the mole ratio of the active Pt-based metal to the inactive La-based metal is in the range from 10:1 to 1:10.

6. The electrode catalyst of claim 1, wherein the conductive support comprises a material selected from the group consisting of active carbon, carbon black, conductive carbon, graphite, carbon nano tube, carbon nano fiber, carbon molecular sieve, and combinations thereof.

7. The electrode catalyst of claim 1, wherein the amount of the active Pt-based metal is in the range from 5 to 80 wt % of the supported catalyst.

8. A fuel cell comprising:
an electrode catalyst supported by a conductive support and comprising an ionically bonded compound having an active Pt-based metal and halogen, and an ionically bonded compound having an inactive La-based metal and halogen, wherein the ionically bonded compound having the active Pt-based metal and halogen, and the ionically bonded compound having the inactive La-based metal and halogen are uniformly dispersed with the conductive support and do not form an alloy, wherein the Pt-based metal comprises Pt, and wherein the inactive La-based metal comprises at least one lanthanoid selected from the group consisting of Tm, Lu, Yb, Er, Ho, Dy, Tb, Gd, Eu, and La.

9. The fuel cell of claim 8, further comprising an electrode substrate adapted to provide a reaction gas to the electrode catalyst, wherein the electrode catalyst is applied on the electrode substrate to form at least one of an anode or a cathode of the fuel cell.

10. The fuel cell of claim 8, wherein the fuel cell is a proton exchange membrane fuel cell or a direct methanol fuel cell.

11. The electrode catalyst of claim 1, wherein the active Pt-based metal is Pt and the inactive La-based metal is Tm.

* * * * *